United States Patent [19]

Landis

[11] Patent Number: 4,463,414

[45] Date of Patent: Jul. 31, 1984

[54] ALTERNATING CURRENT POWER SUPPLY FOR HIGHLY INDUCTIVE LOADS

[75] Inventor: James P. Landis, Wauwatosa, Wis.

[73] Assignee: Pillar Corporation, Milwaukee, Wis.

[21] Appl. No.: 416,855

[22] Filed: Sep. 13, 1982

[51] Int. Cl.³ .......................................... H02P 13/26
[52] U.S. Cl. .................................... 363/86; 323/282; 219/10.77
[58] Field of Search .............. 219/10.55 B, 10.75, 219/10.77, 114; 323/217, 235, 237, 265, 282; 363/34, 37, 85–87, 124, 96; 307/252 J

[56] References Cited

U.S. PATENT DOCUMENTS 3,176,212  3/1965  DePuy .................................. 363/86
3,328,596  6/1967  Germann et al. ................. 363/37 X
3,412,315  11/1968  Hehenkamp .......................... 363/96
3,761,796  9/1973  Jensen .............................. 323/266 X Primary Examiner—William M. Shoop
Attorney, Agent, or Firm—Fred Wiviott

[57] ABSTRACT

A power supply for a highly inductive load comprises a variable DC source, a unidirectional controlled switching device coupled to the DC source, an inductance in series between the controlled switching device and the load and a capacitance shunting the load. The controlled switching device has a gate coupled to receive a voltage signal functionally related to that across the load so that the controlled switching device will be turned on at the frequency of oscillation of the voltage across the load to provide current pulses to the load.

6 Claims, 4 Drawing Figures

4,463,414

ALTERNATING CURRENT POWER SUPPLY FOR HIGHLY INDUCTIVE LOADS

BACKGROUND OF THE INVENTION

This invention relates to power supplies for highly inductive loads.

Inductive devices, such as induction heating equipment, require an alternating and generally high frequency power source. Such prior art power supplies have usually been of the motor generator, magnetic multiplier or solid state types which were characterized by relatively high cost or complexity or inflexibility with regard to frequency adjustment or had limited range of power level adjustment.

SUMMARY OF THE INVENTION

It is an object of the invention to provide a new and improved power supply for inductive loads.

Another object of the invention is to provide a power supply for inductive loads which is relatively simple yet reliable and efficient.

A further object of the invention is to provide a power supply for inductive loads which is relatively small in size and weight.

A still further object of the invention is to provide a power supply for inductive loads which is relatively flexible with regard to allowable frequency, range of allowable voltage at full power and a wide range of power level adjustment.

Yet another object of the invention is to provide a power supply for inductive loads which is capable of rapid shut-down without component failure under fault conditions in the highly inductive load.

Still another object of the invention is to provide a power supply for inductive loads.

It is yet a further object of the invention to provide a power supply for highly inductive loads wherein the load is at substantially zero DC potential with respect to ground.

These and other objects and advantages of the present invention will become more apparent from the detailed description thereof taken with the accompanying drawings.

In general terms the invention comprises a power supply for a highly inductive load including a variable DC source coupled to the load, a unidirectional, controlled switching device coupled to the DC source, inductor means in series between the switching device and the load and capacitance means shunting said load. The load and the capacitance form a tank circuit and the controlled switching device has a gate coupled to receive a voltage signal functionally related to that across the load whereby the controlled switching device will be turned on at the frequency of oscillation of the voltage across the load to provide current pulses to the load.

DETAILED DESCRIPTION OF THE EMBODIMENTS

Figure 1:
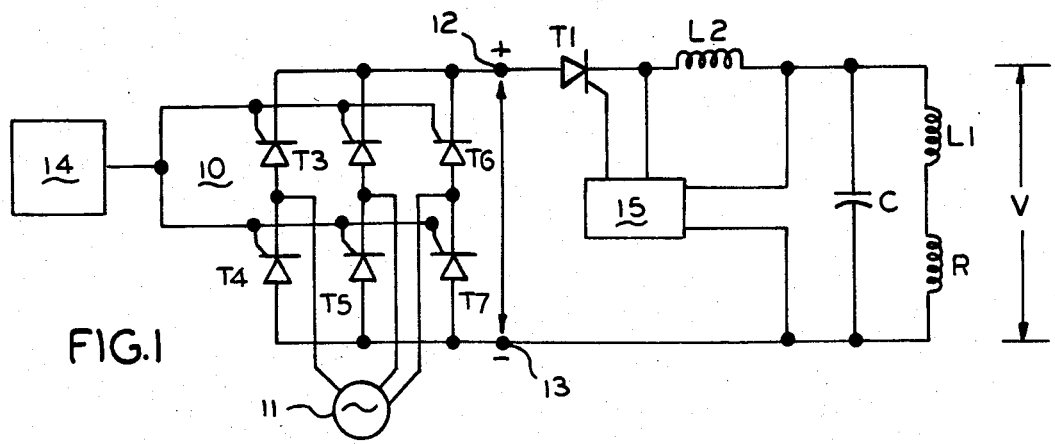
FIG. 1 shows a first embodiment of the power supply in accordance with the invention.

FIG. 1 shows a power supply circuit in accordance with a first embodiment of the invention for supplying high frequency alternating current energy to an highly inductive load symbolized by the serially connected induction L1 and resistor R which are collectively hereinafter called the load coil L1R. The power supply circuit includes a DC power supply 10 which may take any well-known form but in the illustrated embodiment comprises phase controlled thyristors T3–T8 coupled to a three-phase AC supply 11 for supplying a voltage E at terminals 12 and 13. Coupled to terminal 12 is the anode of a unidirectional controlled switching device, such as a thyristor T1, the cathode of which is connected to one end of an inductor L2 connected in series with the parallel combination of the load coil L1R and a shunt capacitor C1.

The thyristors T3–T8 each have a gate connected to a control circuit 14 of a type well known in the art and accordingly will not be discussed for the sake of brevity. It will be sufficient for purposes of understanding the invention to state that the control circuit 14 is operative to provide gate signals to thyristors T3–T8 at phase angles which are adjustable whereby the voltage provided at terminals 12 and 13 is adjustable accordingly.

The gate and cathode of thyristor T1 are connected to a control circuit 15 which is also connected to sense the voltage across L14. The control circuit 15 is conventional and therefore will not be discussed in detail. It will be sufficient for understanding the operation of the invention to state that the voltage across the load will be sensed and this value will be compared to some reference potential. The timing of gate signals to the thyristor T1 will be determined by the relationship of these potential signals.

Figure 2:
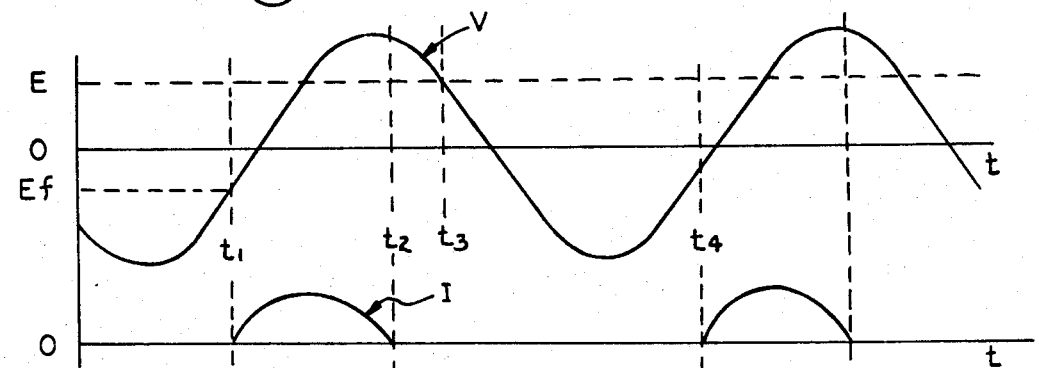
FIG. 2 shows the voltage and current wave forms provided to the load by the supply of FIG. 1.

FIG. 2 shows the time relationship between the voltage V across the load coil L1R and the current I flowing through the coil L2 and the voltage E between the terminals 12 and 13.

The capacitor C and the load coil L1R comprise a tank circuit which will oscillate continously if driven by pulses of input power. In the circuit of FIG. 1, such pulses are provided as a result of the thyristor T1 being turned on periodically. As a result, the voltage V across te load coil L1R comprises a generally sinusoidal wave form as shown in FIG. 2.

The control 15 may be constructed and arranged to provide a gate signal when the voltage V rises above Eg at time t1 as shown in FIG. 2. As a result, a current pulse I will flow to the load coil L1R. As the voltage across the load coil L1R rises, the current I peaks as the voltage rises above the voltage E and will then begin decreasing until the time $t_2$ when the current I becomes zero turning the thyristor T1 off. The thyristor T1 will remain extinguished until time $t_4$ when the cycle is repeated.

As those skilled in the art will appreciate, it is essential that the voltage V exceed the magnitude of the DC source E in order that the thyristor T will be properly extinguished. It will thus be seen that a system operating with a constant potential DC supply will have limitations with regard the minimum voltage at which the tank circuit can be operated. This problem can be overcome by utilizing a variable voltage source 10.

FIG. 2 illustrates typical wave forms of current and voltage assuming that the system is in a steady state mode of operation. However, somewhat more complex wave forms prevail during the first few cycles after starting. As can be shown mathematically, and as is known by those skilled in the art, a system such as that of FIG. 1 will be capable of starting and providing a suitable period of reverse bias for the switching device only if proper relationships exist between L1 and L2. This relationship typically requires that the inductance of L2 be of the order of one-fifth that of L1. When such a relationship between L1 and L2 is used, the duration of the current pulse will typically be relatively shorter than that illustrated in FIG. 2, and the sinusoidal character of the tank voltage will be more distorted than that illustrated. In applications demanding that switching device T1 have a duty cycle similar to that shown in FIG. 2 and that the distortion of the tank voltage be at a minimum, the relationship previously described between L1 and L2 must be altered so as to incorporate a higher relative inductance in L2. Such operation is entirely possible if auxiliary means (not shown) is used to excite oscillation of the tank circuit prior to initial firing of the controlled siwtching device T1. Such starting means is conventionally used in other solid state systems for powering such tank circuits, and it is well undestood by those skilled in the art and will therefore not be discussed for the sake of brevity.

A shortcoming of the embodiment to FIG. 1 is that one end of the energized, highly-inductive coil L1R is connected to one of the terminals of the DC power source 10. While in the embodiment of FIG. 1, the coil L1R is connected to the negative terminal 13, the system could be oppositely polarized so that the thyristor T1 and the inductor L2 would be connected to the negative terminal 13, thereby connecting the upper end of the coil L1R to the positive terminal 12 of the DC supply 10. In either event, the coil terminal connected to the power source will be at some DC potential other than ground. This condition is acceptable in some applications but detrimental in others. For example, in the case of water-cooled coils, it is advantageous to have the coil at zero DC potential to ground so as to eliminate the likelihood of electrolysis problems associated with the cooling water.

Figure 3:
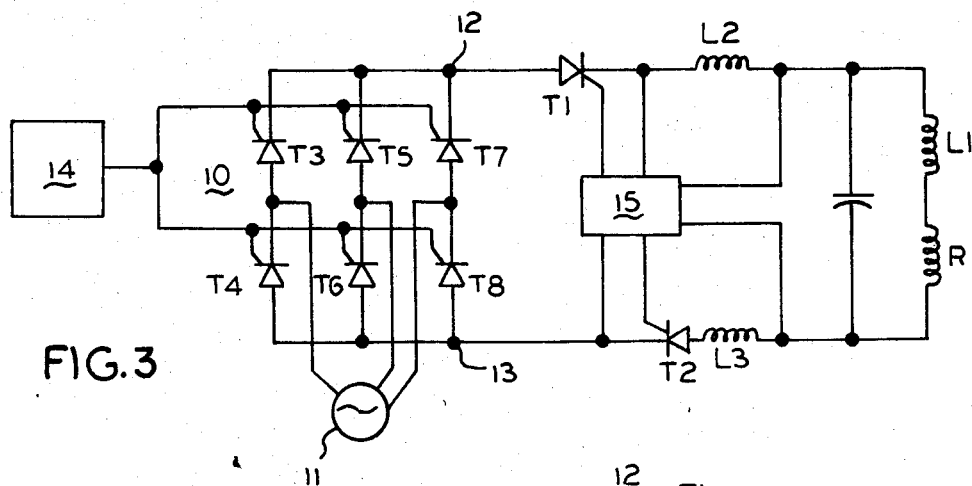
FIG. 3 is an alternate embodiment of the invention shown in FIG. 1.

In order to maintain a potential to ground which is essentially zero volts DC, the embodiment of FIG. 3 may be employed. Here a second unidirectional control switching device or thyristor T2 and a second series inductor L3 are connected in series between the negative terminal 13 of the power source and the load coil L1R. Preferably, the second thyristor T2 is turned on by control 15 simultaneously with the thyristor T1. The second series inductor L3 may be either independent of, or mutually coupled to the first series inductor L2. The embodiment of FIG. 3 is also shown to incorporate an adjustable power supply so that a wide range of power control is possible while the coil L1R is at substantially zero DC potential with respect to ground.

Figure 4:
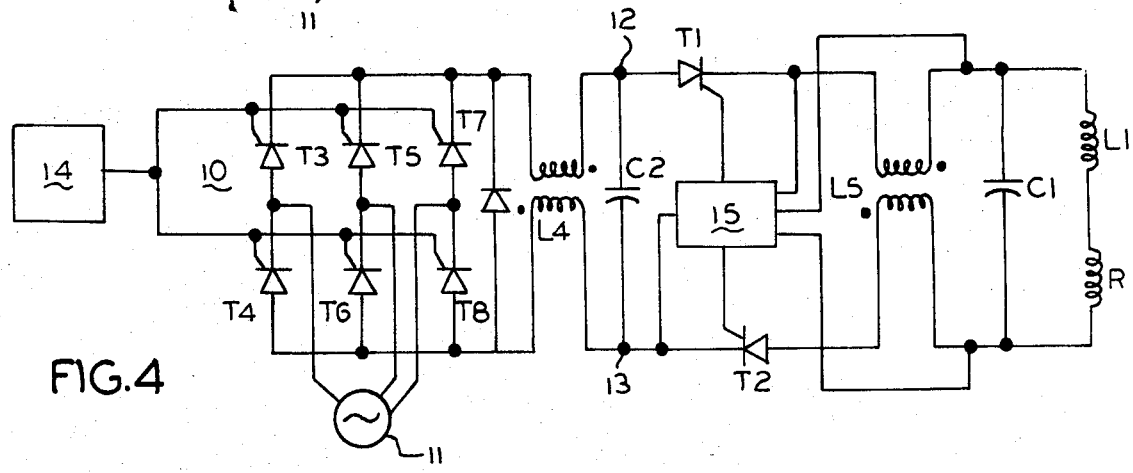
FIG. 4 is the preferred embodiment of the invention.

Under certain modes of failure in the embodiments of FIGS. 1 and 3, and in particular in cases of a fault in the highly conductive load coil L1R, the unidirectional controlled switching devices T1 and T2 may fail to extinguish properly and go into a state of sustained conduction. FIG. 4 shows an alternate embodiment of the invention which incorporate protective means which permits rapid reestablishment of service without blowing of fuses or the like.

More particularly, the embodiment of FIG. 4 includes a free-wheeling diode D1 connected across the voltage source 10, an input filter choke L4 and a filter capacitor C2 connected across the terminals 12 and 13. This provides filtered DC power to the balance in the system. Additionally, the input filter choke L4 provides a means for current rise limiting so that in the event of a short circuit across the input of the DC source, there will be sufficient time for the control 14 to be turned off prior to attaining the level of DC current which may be damaging. In addition, the embodiment of FIG. 4 will achieve maximum balance of DC potential to ground. Also, both inductive elements L4 and L5 incorporate two windings which are mutually coupled to provide balanced operation as regards to positive and negative sides of the circuit.

While the embodiment of FIG. 4 is shown to have a pair of unidirectional switching devices T1 and T2, only a single such device and single winding inductors L5 and L4 may be employed where the characteristic of the load coil L1R is such that a DC potential to ground is not disadvantageous. The single switching device and coil winding may be provided in either the positive or negative side of the circuit.

While only a single embodiment of the invention has been illustrated and described, it is not intended to be limited thereby but only by the scope of the appended claims.

I claim:

1. An alternating power supply for a highly inductive load comprising a DC source coupled to said load, a unidirectional controlled switching device connected in series between each terminal of said voltage source and said load for passing current pulses therebetween, inductor means connected in series between said switching devices and said load, capacitance means shunting said load, said load and said capacitance means forming a tank circuit having a resonant frequency, said controlled switching devices each having a turn-on means coupled to simultaneously receive an alternating voltage turn on signal having the frequency of the resonant frequency so that said controlled switching device will be turned on at the resonant frequency to provide current pulses to said load having said resonant frequency, the stored energy of the capacitance means being operative to turn the controlled switching device off between alternations of the voltage.

2. The power supply set forth in claim 1 and including a choke coil and a filter capacitor connected between said voltage source and said controlled switching devices.

3. The power supply set forth in claims 1, or 2 wherein the inductance of said inductor means is about one-fifth of that of said load.

4. The power supply set forth in claim 1 wherein said DC source is variable.

5. The power supply set forth in claim 1 and including a choke coil and a filter capacitor connected between said voltage source and said controlled switching devices.

6. The power supply set forth in claims 1, 2 or 5 wherein the inductance of said inductor means is no more than about one-fifth of that of said load.

* * * * *